United States Patent Office
2,815,378
Patented Dec. 3, 1957

2,815,378

HYDRATION OF α-PINENE OXIDE

Eugene A. Klein, Jacksonville, Fla., assignor to The Glidden Company, Cleveland, Ohio, a corporation of Ohio No Drawing. Application June 12, 1953,
Serial No. 361,420

20 Claims. (Cl. 260—587)

The present invention relates to an improved process for producing sobrerol, and other products resulting from the hydration of pinene oxide.

Sobrerol is a useful intermediate in that it can be converted in good yield to carvacrol and to carvone and other members of the carvone series such as the carveols and their esters, and also the hydrogenated carvones and hydrogenated carveol derivatives. Methods for carrying out these conversions are known.

Members of this group of 2-oxygenated compounds of the p-menthane series as defined above are major components of spearmint, caraway, dill and other essential oils, and are therefore important flavor and odor chemicals.

α-Pinene epoxide may be prepared by the action of perbenzoic acid on α-pinene as is known in the art. This epoxide is optically active if the starting α-pinene is optically active. It is also known that α-pinene oxide may be converted by hydration under acidic conditions to sobrerol and to α-campholene aldehyde. The hydration of pinene oxide is accompanied by isomerization of the pinene nucleus, a phenomenon which occurs with the pinenes themselves upon hydration under acidic conditions.

corded was that of the active form. This fact must be borne in mind when consulting the prior art on this subject. When the pinene oxide was totally racemic or where the sobrerol had been produced under various acidic conditions and had sufficiently long contact with acidic conditions, the sobrerol was totally racemic and the complication outlined above was not present.

Thus, the acidic hydration of α-pinene oxide always gives some racemic sobrerol and the possible yield of fully active sobrerol is reduced by the extent to which racemization occurs under the specified acidic conditions. Further, if fully active sobrerol is desired when practicing the prior art, it must be recovered by fractional crystallization of a partly active mixture of racemic and optically active sobrerol.

Accordingly, it is an object of the present invention to provide an improved process for hydrating α-pinene oxide.

A further object is to provide an improved process for preparing sobrerol.

Another object is to provide a process for hydrating optically active α-pinene oxide to sobrerol with substantially complete retention of the optical activity of the sobrerol.

Other objects will be apparent to those skilled in the art.

It has been found that the foregoing objects can be accomplished by hydrating the α-pinene oxide with water that is substantially neutral or mildly alkaline; that is, with avoidance of markedly acidic conditions. Under these preferred conditions, high yields of sobrerol are obtained with negligible racemization. It will be recognized that the conversion of an α-pinene derivative to the related monocyclic derivative without the use of acid or pyrolysis is a novel feature of this invention.

Another valuable feature of this invention is that corrosion problems that attend the use of an acidic hy-

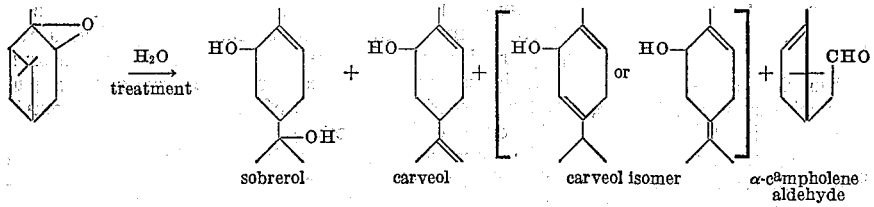

sobrerol     carveol     carveol isomer     α-campholene aldehyde

The hydration of pinene oxide with aqueous acids, which was known to the prior art, suffers from several disadvantages, the most outstanding of which is that sobrerol is racemized by acids. The degree of racemization depends upon acid strength, time of contact, temperature, etc., but is always present under conditions described in the prior art. Inasmuch as it is desirable to provide economic syntheses for the carvone-carveol series and their hydrogenation products, as well as optically active forms thereof, it is evident that it is important to provide a method for converting pinene oxide to optically active sobrerol by a method which avoids conditions leading to the racemization of sobrerol since such racemization of sobrerol decreases its value as an intermediate for producing the optically active carvones, carveols and hydro-products.

In the hydration of α-pinene oxide by the methods employed in the prior art, the sobrerol produced is always racemized to some degree. Inasmuch as the active form is the high-melting (150° C., approximately) and is in general less soluble than the inactive form (melting point 130° C., approximately), the two can be separated by fractional crystallization. Thus, in recrystallizing to a constant melting point sobrerol prepared according to the prior art from partly active pinene oxide, the racemic portion of the sobrerol produced was discarded in the mother liquors of the crystallization and the melting point redration medium are hereby eliminated. Further, the sobrerol obtained by the practice of this invention, being free of acid, may be readily used without the additional steps which would be necessary to free it of acid if it had been made according to the prior art. Thus, we may accomplish our objects by treating α-pinene oxide with distilled water or other substantially neutral water such as ordinary tap water at or near room temperature. However, the reaction may be carried out hot and the water may be made deliberately alkaline. In general, it is necessary to heat the mixture of water and pinene oxide to secure reasonably rapid hydration if the medium has been made markedly alkaline. Since α-campholene aldehyde is produced simultaneously with sobrerol on hydration of pinene oxide, and since the aldehyde is readily oxidized by the air to the corresponding acid, the use of an antioxidant in the reacting mixture is helpful in preventing the undue acidity which might otherwise be produced by the formation of α-campholenic acid. Also, emulsifiers may be employed in order to bring about better contact of pinene oxide and the aqueous phase. It will be appreciated that the aqueous phase may contain water-soluble organic materials such as acetone, alcohol, etc., if desired, though the presence of these materials does not cause particularly desirable effects though they may influence the speed of hydrolysis, etc. somewhat. In addition to the sobrerol and α-campholene aldehyde, there are produced small amounts of carveol as well as a hitherto undescribed alcohol, an isomer of carveol, whose exact structure has not been elucidated but which is itself a valuable intermediate for producing carvacrol, carvomenthone and other members of the p-menthane series oxygenated in the 2-position. It is known that this unknown alcohol, therefore, is oxygenated at the 2-position of the p-menthane skeleton.

It is also, therefore, a novel aspect of our invention that since the pinene oxide hydration products are produced without the use of acidity, the mixture is suited to fractionation for separation of each of the individual hydration products or fractions enriched therein. Such mixtures produced in the prior art would require neutralization prior to such fractionation treatment since if acidity is present, the hydration products should not be heated because heating in the presence of acids causes formation of pinol and other decomposition products not suited for use as intermediates in the preparation of 2-oxygenated p-menthanes.

In conducting the improved hydration of pinene oxide, we therefore find that it is very satisfactory to conduct the hydration under neutral or weakly alkaline conditions, to separate the sobrerol from the liquid phase, to separate the aqueous phase saturated with sobrerol and reuse it for a subsequent hydration whereby the dissolved sobrerol is not lost, and to recover from the organic liquid phase suitably by fractional distillation, α-campholene aldehyde, carveol, the hitherto unknown isomer of carveol and additional sobrerol, together with any pinene oxide remaining unreacted. Alternatively, the bulk of the aqueous hydrating phase may be separated from the reacted organic phase including sobrerol and the whole organic phase may then be subjected to fractional distillation for recovery of its individual constituents including the whole of the sobrerol whereby the sobrerol is recovered dry and ready for succeeding conversion steps to produce members of the p-menthane series oxygenated at the 2-position.

The following examples are ilustrative of our invention.

Example 1

Five hundred grams of 1-α-pinene oxide, $[\alpha]_D-145°$, was stirred with one liter of a buffer solution at pH 8.0. The buffer solution was prepared by dissolving 54 grams of disodium phosphate U. S. P. in water and diluting to one liter, then adding solid tartaric acid U. S. P. in small amounts with stirring until the pH of the solution was exactly 8.0. Stirring the mixture of α-pinene oxide and buffer solution at room temperature resulted in practically no attack on the α-pinene oxide. The reaction proceeded slowly at 70–80° C., and at a reasonable rate at 90–95° C. Upon heating and stirring for 12 hours at 90–95° C., then allowing the mixture to stand overnight to cool, there was observed a semi-solid mass of sobrerol crystals in the flask on the following morning. Some of this sobrerol was removed from the flask, centrifuged to remove adhering oil and water, and rinsed with a small amount of light petroleum, in which sobrerol is nearly insoluble. Without further treatment, 10 grams of this sobrerol was dissolved and diluted to 100 cc., with methanol, and its rotation taken. Found $[\alpha]_D-149.0°$.

The pH of the water layer which separated was measured at 7.9.

Example 2

Two hundred cc. of distilled water was shaken with 9 cc. of tri-n-butyl amine and the amine layer separated. The pH of the water layer was measured at 10.1 with a Beckman pH meter. The amine and water layers were recombined and 100 grams of α-pinene oxide $[\alpha]_D-145°$, was added. This mixture was stirred and refluxed for 6 hours, then allowed to stand overnight. The following morning the mixture was observed to be heavy with sobrerol crystals, which after centrifuging and rinsing with light petroleum, showed $[\alpha]_D-148.5°$. The mixture was then refluxed 12 hours longer, which was sufficient to cause reaction of all of the α-pinene oxide. Fifty grams of sobrerol was obtained from the direct centrifuging and washing operation. Allowance for the sobrerol contained in the water layer and for the amount estimated in the oil by infrared absorption measurement brought the yield up to about 70% of theory. The pH of the water layer at the end of the reaction was measured at 7.8. The fall in pH may have been due to some air oxidation of the α-campholene aldehyde to acid, as no antioxidant was used in this experiment.

Example 3

To 19 liters of well-agitated distilled water plus 18 grams of ditertiary-butyl-p-cresol was added 19.84 kilograms (130 mols) of pure α-pinene oxide that was about half racemic, half d-form. The temperature was maintained at 30–50° C., first with ice bath cooling and then with tap water cooling. The addition of the pinene oxide required one and a half hours. After the addition was complete and the exothermic reaction was about over, the mixture was stirred for two and a half hours at about 30° C., and then centrifuged to separate the crude sobrerol from the liquid phase consisting of oil and water. The crude sobrerol was washed with naphtha and then air dried to yield 14.81 kilograms (87.5 mols) of pure sobrerol, $[\alpha]_D^{25}-77.0°$. It was found that one liter of the aqueous phase from the reaction contained 22 grams of sobrerol, so, therefore, the entire aqueous phase contained 0.42 kilogram (2.5 mols) of sobrerol.

An infrared spectrum of the crude oil showed the presence of secondary and tertiary hydroxyl and non-conjugated carbonyl groups. The oil was fractioned through an efficient Stedman type column at 10 mm. absolute pressure to a head temperature of 120° C. The pressure was then reduced to 2 mm., and the distillation continued to a final pot temperature of 220° C. Fifty-five fractions were collected and these ranged in size from 47 to 116 grams. Infrared spectra were recorded for many of the fractions and these indicated the number of compounds present as well as their structure.

Analytical data obtained from the fractionation and spectra showed the presence of the following compounds in the order of their boiling points:

(A) Cymene plus other unidentified hydrocarbons and carbonyl material comprised the fractions boiling at 49–74° C., at 10 mm. The cymene was identified by comparison of the infrared spectra of the fractions containing it with the spectrum of pure cymene.

(B) α-Campholenealdehyde was the major compound boiling at 10 mm. It was identified by comparing the spectra of these fractions with the spectrum of a pure known sample.

(C) Carveol and a new alcohol were the primary products boiling at 105–106.5° C., at 10 mm. The fractions containing a mixture of these compounds were partially crystalline and were centrifuged. Carveol was the major component of the liquid phase and was identified by comparison of the spectrum of this liquid phase with the spectrum of a known sample of pure carveol. The crystalline solid removed by centrifuging was a new alcohol recrystallized from light naphtha until a fully optically active fraction was produced possessing the following physical properties:

|  | Degree C. |
|---|---|
| Melting point | 73–74 |
| Mixed melting point with fully active sobrerol [1] | 88–90 |
| $[\alpha]_D^{25}$ (20 g. 100 cc., in methanol) | +77.5 |

[1] Melting point of sobrerol 150° C.

Fractions of partially active material separated from the crystallization step were shown to possess melting points between 45 and 60° C. The solid was characterized by its infrared and ultraviolet spectra as follows and interpretations as indicated were made:

(1) The major absorption bands were at the following wavelengths ($\mu$): 3.0 B, 7.86, 8.18, 8.39, 8.7, 8.89, 9.63 B, 10.42, 10.7, 10.85, 11.00, 11.65, 12.43 B, 13.63. The wavelengths marked "B" are the center points of broad absorptions.

(2) The absorptions at 3.0 represent an associated hydroxyl group.

(3) The absorption at 9.63 B is due to a secondary hydroxyl group.

(4) The presence of a trisubstituted ethylene group is evidenced by the absorption at 12.43 B$\mu$.

(5) The optical density of the associated hydroxyl absorption in a spectrum of a diluted sample of the alcohol corresponded to the value to be expected of a monohydric terpenic alcohol in equal dilution.

(6) The ultraviolet spectrum on the alcohol showed no conjugated system.

(7) Absorptions due to the $CH_2{=}C{<}$ grouping are absent.

The alcohol was further treated chemically to establish its nature and value:

(a) On refluxing with 25% sulfuric acid solution, it yielded a mixture of hydrocarbons containing about 60% cymene, thus proving the p-menthane arrangement of carbon atoms and indicating that two double bonds and a readily dehydratable hydroxyl group were present.

(b) Low pressure hydrogenation with platinum oxide catalyst resulted in absorption of two mols of hydrogen per mol of alcohol, assuming the molecular weight of the latter to be 152, thus corresponding to a carveol isomer.

(c) Beckmann oxidation of the saturated alcohol produced in (b) above yielded carvomethone, thus proving the position of the hydroxyl group on the p-menthane ring.

(d) Beckmann oxidation of the unsaturated carveol isomer produced a conjugated carbonyl compound and carvacrol. The latter was produced by aromatization of the carbonyl compound.

The only compounds derivable from pinene oxide by the procedure outlined and whose properties could be consistent with the results of the various physical and chemical tests applied as above would be 1,4-p-menthadiene-6-ol and 1,4(8)-p-menthadiene-6-ol. Of these, we believe the former probably represents the structure of the new alcohol. In any case, it is evident that the new alcohol is capable of conversion to carvomenthone, carvacrol and other valuable products.

(D) Sobrerol was the product boiling at approximately 130° C. at 2 mm.

(E) Sobrerol primarily comprised the crystalline distillation residue.

Analytical data obtained from isolation of crystalline sobrerol, distillation and interpretation of infrared spectra showed the hydration of pinene oxide produced the following approximate yields (the percentage yields are expressed on a molar basis):

| | Kg. | Mols | Percent |
|---|---|---|---|
| Sobrerol | 16.89 | 100 | 77.0 |
| Carveol | 0.80 | 5.3 | 4.1 |
| Hydrocarbons and other low boiling compounds | 0.62 | 4.7 | 3.6 |
| New alcohol | 1.03 | 6.0 | 4.6 |
| α-Campholenealdehyde | 2.11 | 14.0 | 10.7 |
| | | | 100.0 |

*Example 4*

One thousand grams (6.57 mols) of pure 1-pinene oxide ($[\alpha]_D^{25}-145°$) was added with vigorous stirring to one liter of distilled water at 100° C. The mixture was heated at 100° C. with stirring for 1½ hours after the addition was complete. The slurry of sobrerol in the liquid reaction products was then filtered. The crude sobrerol was purified by washing it with light naphtha to yield sobrerol, M. P. 150–151° C., $[\alpha]_D^{25}-145°$ (10 g./100 cc., in methanol). The oil layer was fractionated to yield campholenealdehyde (B. P. 80° C./10 mm.), carveol (B. P. 105° C./10 mm.), the new alcohol (B. P. 105° C./10 mm.) and sobrerol (B. P. 130° C./2 mm.).

Analytical data derived from the isolation of crystalline sobrerol, distillation and infrared spectra showed the reaction to produce the following approximate yields expressed on a molar basis:

| | Percent |
|---|---|
| Sobrerol | 69 |
| α-Campholenealdehyde | 15 |
| Carveol and the new alcohol | 16 |
| | 100 |

Example 3 shows the use of distilled water without the addition of basic materials to raise the pH value. Actually the pH value of the distilled water I have used varies from 6 to 7 and the term "non-acidic conditions" as used in the claims refers to hydrogen ion concentrations of distilled water or lower. Thus the preferred conditions for hydrolysis are substantially neutral to mildly alkaline conditions.

Having described the invention what is claimed is:

1. The process which comprises hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C.

2. The process of producing sobrerol which comprises the steps of hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C. and separating the sobrerol so formed from the liquid portion of the hydration mixture.

3. The process of claim 1 in which the α-pinene oxide is optically active.

4. The process of claim 2 in which the α-pinene oxide is optically active.

5. The process for producing hydration products of α-pinene oxide which comprises hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C., separating the crystalline sobrerol formed from the liquid portion of the hydration mixture and thereafter fractionally distilling the organic liquid portion to recover fractions enriched in α-campholene aldehyde, carveol, sobrerol and a monohydric alcohol whose optically active form melts at 73–74° C.

6. The process which comprises hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C., separating the crystallized sobrerol formed from the liquid portion of the hydration mixture and thereafter fractionally distilling the organic layer of the liquid portion to recover therefrom a fraction enriched in carveol.

7. The process which comprises hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C., separating the crystallized sobrerol formed from the liquid portion of the hydration mixture and thereafter fractionally distilling the organic phase of the liquid portion to recover therefrom a fraction enriched in a monohydric alcohol having a boiling point of 106.5° C., at 10 mm., and whose optically active form melts at 73–74° C.

8. The process which comprises hydrating α-pinene oxide by treating the same with water at a hydrogen ion concentration not exceeding that of distilled water for a time sufficient to cause substantial hydration of the α-pinene oxide and the formation of a mixture comprising sobrerol, carveol, α-campholene aldehyde and a monohydric alcohol whose optically active form melts at 73–74° C., separating the crystallized sobrerol formed from the liquid portion of the hydration mixture and thereafter fractionally distilling the organic phase of the liquid portion to recover therefrom a fraction rich in α-campholene aldehyde.

9. The process of claim 5 in which the α-pinene oxide is optically active.

10. The process of claim 6 in which the α-pinene oxide is optically active.

11. The process of claim 7 in which the α-pinene oxide is optically active.

12. The process of claim 8 in which the α-pinene oxide is optically active.

13. The monohydric p-menthadiene secondary alcohol having a boiling point of 106.5° C., at 10 mm., and a melting point of 73–74° C., for its optically active form, said alcohol being further characterized in that the hydroxyl group is in the 6-position and in that the two double bonds are non-conjugated, one of which is a 1–2 double bond, and the other involves the number 4 carbon atom.

14. In a process for producing a menthadienol isomeric with carveol, the steps comprising the fractional distillation of a mixture of pinene oxide hydration products containing carveol and said menthadienol isomeric therewith to recover a fraction enriched in carveol and said isomer, then subjecting this fraction to a crystallization, and then separating the crystalline menthadienol isomeric with carveol from the mother liquor.

15. The process of claim 14 in which the pinene oxide hydration products are produced under non-acidic conditions.

16. The process of claim 14 in which carveol is recovered from the mother liquors of the crystallization step.

17. The process of claim 16 in which the pinene oxide hydration products are produced under non-acidic conditions.

18. The process for producing p-menthane-2-ol which comprises hydrogenating the double bonds of the alcohol of claim 13.

19. The process which comprises oxidizing the hydroxyl group of the alcohol of claim 13 to a keto group whereby there is formed a menthadienone capable of isomerization to carvacrol.

20. The process which comprises oxiding the hydroxyl group of the alcohol of claim 13 to a keto group and isomerizing the resulting menthadienone to carvacrol.

References Cited in the file of this patent

Armstrong et al.: Chemical Soc. J. (London), vol. LIX, 1891, pp. 311–320.

Heusler: Chemistry of the Terpenes, P. Blakiston's Son & Co., Philadelphia, Pa., 1902; pp. 274–281.

Simonsen: "The Terpenes," vol. II, 2d ed., p. 141 (1947).